United States Patent [19]

Penzel

[11] B 4,005,389
[45] Jan. 25, 1977

[54] ARRANGEMENT FOR REDUCING THE ACCESS TIME IN A STORAGE SYSTEM

[75] Inventor: Hans-Joerg Penzel, Munich, Germany

[73] Assignee: Siemens Aktiengesellschaft, Berlin & Munich, Germany

[22] Filed: Sept. 17, 1974

[21] Appl. No.: 506,839

[44] Published under the second Trial Voluntary Protest Program on March 23, 1976 as document No. B 506,839.

[30] Foreign Application Priority Data

Sept. 21, 1973 Germany .......................... 2347632

[52] U.S. Cl. ............................................ 340/172.5
[51] Int. Cl.[2] ........................................ G06F 13/00
[58] Field of Search ..... 340/173 R, 173 AM, 172.5

[56] References Cited

UNITED STATES PATENTS 3,821,724 6/1974 Warner ........................ 340/173 R
3,863,232 1/1975 Johnson et al. ............ 340/173 AM Primary Examiner—Raulfe B. Zache
Attorney, Agent, or Firm—Hill, Gross, Simpson, Van Santen, Steadman, Chiara & Simpson

[57] ABSTRACT

An arrangement for reducing the access time (increasing the hit rate) by the intermediate storage of a plurality of items of data read out from a working store in a storage system with a working store which is divided into storage modules employs the division of each working store module into a plurality of storage zones which can be read out independently of one another. Instead of providing a common data input and output register for the entire storage module, each storage zone is assigned its own read-out data register and the entire storage module is assigned a common data write-in register.

3 Claims, 1 Drawing Figure

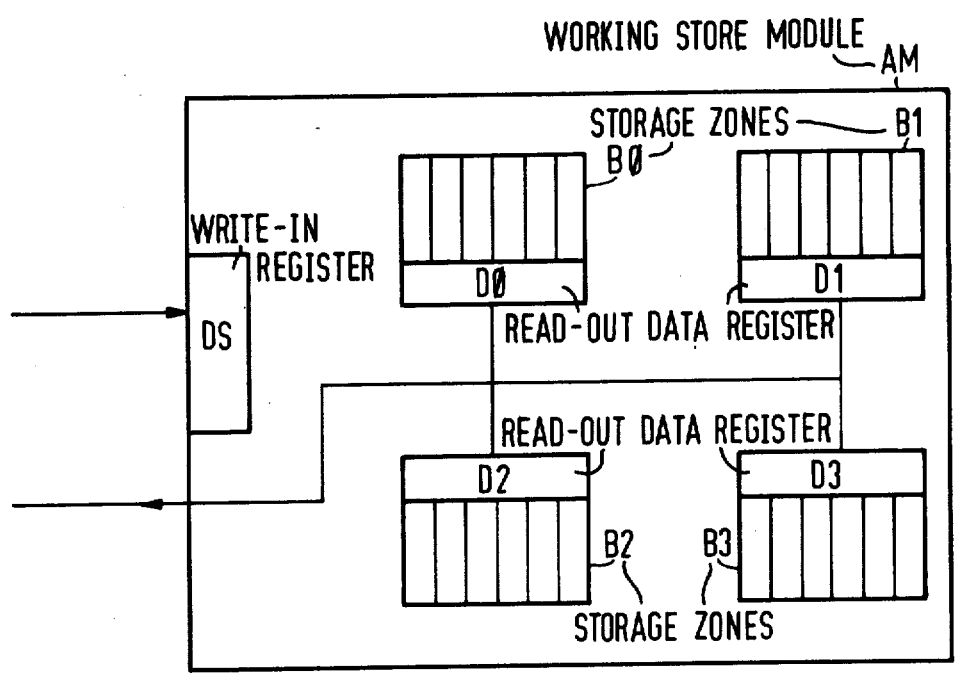

ARRANGEMENT FOR REDUCING THE ACCESS TIME IN A STORAGE SYSTEM

BACKGROUND OF THE INVENTION

1. Field of the Invention

This invention relates to an arrangement for reducing the access time (increasing the hit rate) by the intermediate storage of a plurality of items of data read out from a working store, in a storage system with working stores divided into storage modules.

2. Description of the Prior Art

In view of the fact that high speed working stores are very expensive and, therefore, for reasons of economy, cannot be made to be large; whereas, however, modern data processing systems require larger and larger working stores, the concept of a store hierarchy, which has long existed in respect of the relationship of working stores to periphery stores is currently frequently being applied to the working store itself. In this case, a small, relatively inexpensive but high-speed buffer store is arranged prior to a large, inexpensive but slow main store, and the entire system is organized in such a way that it is initially attempted to fulfill all accesses to the store from the buffer store. If this is not successful, the requested word which is passed on to the processor, is input, together with the entire vicinity of this word (a block), into the buffer store, and it is anticipated that the following processor accesses will then fall either into this block or into a block which has already been input into the buffer store at an earlier point.

If a word requested by the processor is found in the buffer store, this event is referred to as a hit. The number of hits, in relation to the total number of requests made by the processor to the store, is defined as the hit rate. Assuming a sufficient block length and a sufficient capacity of the buffer store, this hit rate can be close to 100%. When main and buffer stores are suitably dimensioned, a storage system of this kind has the advantage of a low access time (buffer store) and a high capacity (main store). The disadvantage of such a storage system, on the other hand, resides in the relatively high costs of the buffer store.

In order to avoid the disadvantages of the high costs of the buffer store, it is also possible to design storage systems which operate entirely without buffer stores, but which are otherwise equipped with a same basic element as working store modules arranged in one (or more than one) storage bank, with an assigned storage bank electronic unit and a common storage bank coordinator. In this configuration, certain buffer store functions are carried out by the storage bank coordinator. In a storage system of this kind, lower costs could be expected because of the omission of the buffer store, but, on the other hand, it would be necessary to accept the disadvantage that the accesses of the processor to the store would always have to be executed as direct accesses to the working store modules, and it would not be possible to exploit the advantages of the words intermediate stored in a buffer store. Therefore, the average access time in a storage system of this type would be considerably greater.

Therefore, it has also already been proposed that in a storage system which has no buffer store, i.e. one which comprises only working store modules arranged in storage banks in each case with a common storage bank electronic unit and a storage bank coordinator, and in which the word width of the stores is greater than the word width required by the processor, the access time of the entire system be reduced, in that the data which are read out in a read-out operation are, until they are overwritten by following storage operations, held in readiness on the read-out data lines between the storage bank electronic unit and the storage bank coordinator. The items of data stored during a read-out operation in the common data input and output registers of the working store modules are not erased immediately at the end of the read-out operation, but remain in intermediate storage in this register until a following access to the working store module. Notwithstanding the advantage of the substantial improvement in the access time, this measure also has a certain disadvantage, inasmuch as the read-out data intermediately stored in the common data input and output register are overwritten by each following storage operation, whether this be a write-in operation or a read-out operation, if only one common data register is, for reasons of economy, provided for write-in and read-out, although a part of this read-out data could be used for following processor requests. Thus, this imposes a certain limitation of the reduction gained in the access time.

SUMMARY OF THE INVENTION

Therefore, the primary object of the present invention is to produce a further reduction in the access time of the entire system in a storage system which has no buffer store in the sensed described above.

This object is achieved, according to the invention, in that each word store module is divided into a plurality of storage zones which can be read out independently of one another. Instead of a common data input and output register for the entire storage module, each storage zone is assigned its own read-out data register and the entire storage module is assigned a common data write-in register. Particularly good results are achieved with the arrangement of the invention if consecutive store addresses are, in each case, distributed amoung adjacent (consecutive) storage zones of a working store module, and if in the execution of a read-out operation the requested store word is read out and input into the data register assigned to the relevant storage zone and, in addition, the store word which is assigned to the following store address is read out from the adjacent (following) storage zone and written into the latter's assigned data register, and if consecutive read-out operations are to be executed by way of consecutive store addresses.

It has been established that when the arrangement constructed in accordance with the invention is employed, the probable hit rate is between 52% and 58%, depending on whether two or four decentralized read-out data registers are provided, and depending upon whether a store word comprises eight or sixteen bytes, when the machine word length amounts to four bytes. This means a quite considerable increase in the efficiency of the storage system compared with a storage system which has no buffer store and in which all of the requests of the processor must be executed as direct accesses of the processor to the working store module. This advantage of reducing the access time of the storage system would, at first glance, appears to have been acquired by a considerably increased expense. This is not the case, however, as for current semiconductor stores, on the one hand, modules which contain only the read-out amplifiers required for the store modules and, on the other hand, modules which also contain an integrated data register in addition to the read-out amplifiers, can be acquired for practically identical costs.

BRIEF DESCRIPTION OF THE DRAWING

Other objects, features and advantages of the invention, its organization, construction and operation will be best understood from the following detailed description taken in conjunction with the accompanying drawings, on which the single FIGURE illustrates a storage arrangement constructed in accordance with the present invention.

DESCRIPTION OF THE PREFERRED EMBODIMENT

The arrangement comprises the working store module AM, which in the exemplary embodiment, is divided into four storage zones B0, B1, B2 and B3. Each of these storage zones can be read out independently of the others. Furthermore, it can be seen that, instead of having a common data input and output register for the entire storage module, each of the storage zones is assigned its own read-out data register D0 – D3 and that a common data write-in register DS is provided for the working store module. As the essence of the invention resides in the division of the working store module into a plurality of storage zones and the provision of decentralized read-out data registers and a common data write-in register, the schematic illustration in the drawing has omitted all other details of a working store module, such as the link of the data write-in register to the storage zones, the devices for addressing the individual storage cells and other details required for the operation of such a storage module, but which are generally known in the art, in order to clarify and simplify the drawing and the explanation of the invention.

The provision of the decentralized read-out data registers D0– D3 in the working store module AM leads to the fact that on the execution of a write-in operation, the write-in data are written into the common data write-in register DS and from the latter are then written directly into the individual storage cells of the storage zones B0–B3. The read-out data which has been intermediately stored in these read-out data registers D0–D3 during this time are not altered. If, in an arrangement constructed in accordance with the invention and as exemplified in the drawing, consecutive store addresses are in each case distributed among adjacent (consecutive) storage zones of a working store module, i.e. in the represented example consecutively among the storage zones B0, B1, B2, B3, and then again among the storage zones B1, etc, and if in the execution of a read-out operation the requested and read-out store word is input into the read-out data register assigned to the relevant storage zone, e.g. the read-out data register D0, and additionally (masked) the store word is, with the following store address, read out from the adjacent (following) storage zone and written into the latter's assigned read-out data register (thus e.g. D1), in the case of processor requests for words which belong to a correlated sequence, the successive processor requests can be satisfied by simply transferring the read-out data from the read-out data registers D0–D3 without the need to carry out an entire read-out operation on each occasion.

Such an operation of the arrangement of the invention, i.e. the simultaneous read-out data in two zones of the working store module AM is possible by virtue of the above-mentioned division into a plurality of storage zones B0–B3.

If, according to the invention, one employs not only the realization of the problem described in the introduction of the specification in order to reduce the access time, but combines this realization with the earlier realization also mentioned in the introduction i.e. which provides that the data read out in a read-out operation be held in readiness on the read-out data lines until they are overwritten by a following read out operation, it is possible to increase the abovementioned probable hit rate still further.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for reducing the access time in a storage system, which system comprises a working store including store modules, by intermediately storing a plurality of items of data read out from the working store, said arrangement comprising:
   a plurality of storage zones in each of said store modules which can be read out independently of one another;
   a plurality of read-out data registers each assigned to a respective storage zone; and
   a common write-in register assigned to all storage zones of a store module.

2. In a method of operating a storage system which has a working store divided into store modules having a plurality of storage zones, a separate read-out data register for each storage zone and a write-in register common to all zones of a store module, comprising the step of distributing consecutive store addresses to consecutive storage zones of the store modules.

3. The process of claim 2, and further comprising the steps of:
   reading out a requested store word and inputting the read word into a corresponding read-out data register; and
   reading out a data word assigned to the following address from the adjacent following storage zone and writing such data word in the latter's corresponding read-out data register.

* * * * *